March 18, 1941.  H. T. KRAFT  2,235,375

PNEUMATIC TIRE

Filed Dec. 22, 1938

INVENTOR
HERMAN T. KRAFT
BY Evans & McCoy
ATTORNEYS

Patented Mar. 18, 1941

2,235,375

UNITED STATES PATENT OFFICE 2,235,375

PNEUMATIC TIRE

Herman T. Kraft, Akron, Ohio, assignor to The General Tire & Rubber Company, Akron, Ohio, a corporation of Ohio Application December 22, 1938, Serial No. 247,151

6 Claims. (Cl. 152—210)

This invention relates to pneumatic vehicle tires, and more particularly to tires of this character provided with means for increasing the tractive properties thereof to prevent slipping or skidding under extreme conditions of service.

In the ordinary operation of automobiles and other self-propelled vehicles employing pneumatic tires it is but infrequently that trouble is experienced with skidding under normal road or driving conditions. Hazards and inconvenience due to this element are most pronounced when abnormal conditions of the pavement or highway on which the vehicle is operated are encountered. For example, when traveling over smooth, clear highways of concrete or asphalt, there is very little objectionable slipping or skidding of the tires with respect to the highway. However, when traveling over a rutted, muddy country road or when traveling over an ordinary highway covered with snow and having numerous ruts therein, the slippage and skidding which occurs between the tires and the road surface is frequently quite objectionable and dangerous.

Numerous devices have been developed to increase the traction of tires on snow-covered or muddy roads, such, for example, as chains or cleats which may extend circumferentially around a tire or be localized with respect thereto. Arrangements of this character have not been entirely satisfactory because of their inconvenience. They must be applied to the tires when the need arises, and be promptly removed, when the road becomes clear, in order to avoid excessive wear. The permanent fastening of cleats or anti-skid devices to the road-engaging tread portion of a tire is not entirely satisfactory since excessive wear occurs when driving over a clear paved highway.

It is, therefore, an object of the present invention to provide a vehicle tire having normal traction and riding characteristics in association with devices carried by the tire which can be brought into operation when desired to increase the normal tractive properties of the tire with respect to the road surface traveled so as to prevent skidding and slipping in bad weather and when traveling over muddy or rutted roads.

Another object is to provide in association with a tire having a road-engaging tread portion of conventional construction, laterally projecting flanges or similar elements which can be brought into operative relation with respect to the road surface upon partial deflation of the tire or when the tire is traveling in a rut.

Another and more specific object is to provide a vehicle tire having laterally extending flange elements in which are incorporated removable or renewable metallic anti-skid elements adapted to increase the tractive properties of the tire under abnormal driving conditions but which normally are held out of engagement with the road surface.

Other objects and advantages will become apparent from the following detailed description of a tire embodying the principles of the present invention which is made in connection with the accompanying drawing, in which.

Figure 1:
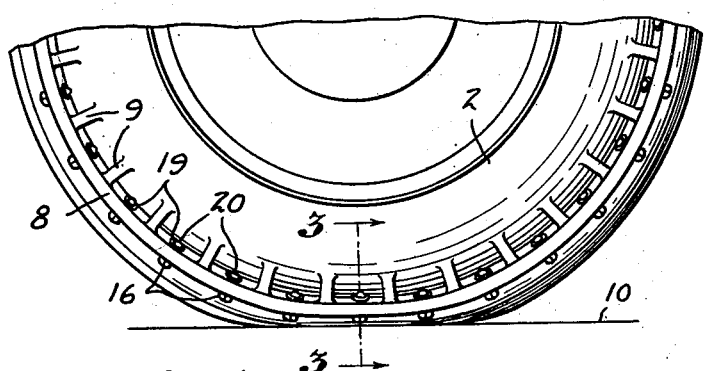
Figure 1 is a fragmentary side elevational view of the tire in engagement with a paved road surface.

The tire shown in the drawing, like parts of which are indicated by the same numerals of reference throughout the several views, comprises a cord or fabric reinforced carcass 1 of well known construction, having side wall portions 2 and 3 covered with relatively thin rubber and a tread portion 4 of relatively thick section. Suitable traction or anti-skid formations such as circumferential upstanding ribs 5 may be integrally formed in the tread portion of the tire. Between the side walls 2 and 3 and the tread 4 are relatively thick sectioned shoulders 6 and 7, the outside surfaces of which are convergent and slope or taper toward the road engaging surface or ribs 5 of the tread wall 4.

Integral with the shoulders 6 and 7 are formed lateral or axially extending flanges 8. These flanges are made of rubber of substantially the same composition and consistency as that employed in the tread wall 4 and ribs 5. It is preferable that the flanges or ribs 8 be circumferential in extent, or substantially so, as shown, about the entire periphery of the casing. At intervals along the flanges 8 are rubber reinforcing gussets 9, integral with the side walls 2 and 3 and the circumferential flanges 28. These gussets strengthen the flanges and resist bending and other deformation of the latter.

Figures 3, 6:
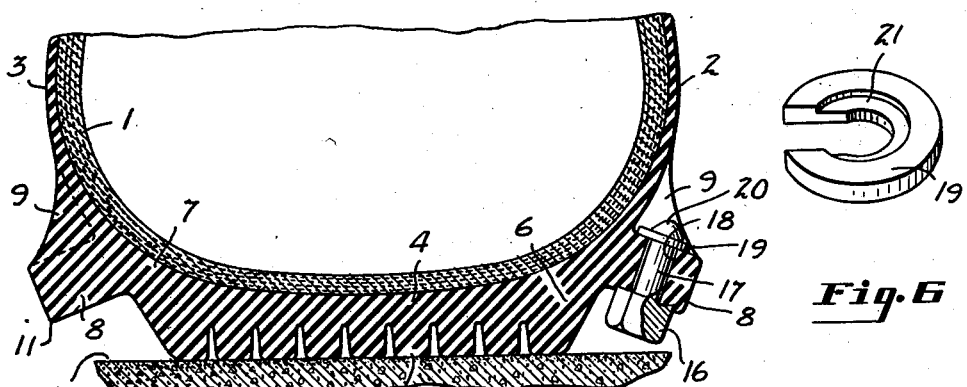
Fig. 3 is a fragmentary sectional detail taken substantially on the line 3—3 of Fig. 1 and enlarged with respect thereto.
Fig. 6 is a perspective view of the locking washer or element used in connection with the stud shown in Fig. 5.
Figure 5:
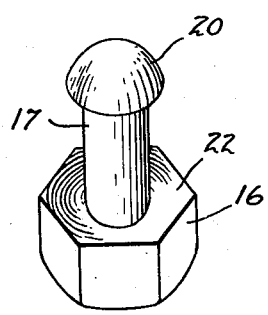
Fig. 5 is an enlarged perspective view of one of the anti-skid lugs.

The flanges 8 which extend laterally with respect to the shoulders and side walls of the tire, preferably have their outer edges directed somewhat radially outwardly so as to be inclined toward surface 10 of the supporting road when adjacent thereto, as shown in Fig. 3. For example, it has been found satisfactory when the flanges 8 are disposed at substantially a right angle with respect to the sloping surfaces of the shoulders 6 and 7. Each of the flanges 8 is of greater width than thickness so as to have increased lateral flexibility which permits yielding thereof when brought into engagement with the road surface, as will later appear.

Figure 2:
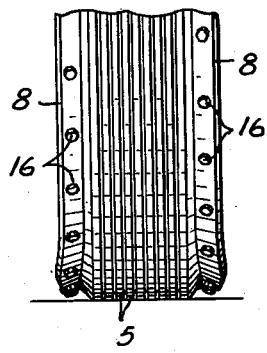
Fig. 2 is a fragmentary and elevational view of the tire.

During normal operation of a vehicle equipped with tires constructed in accordance with the present invention over clear paved highways, the anti-skid formations, such as the ribs 5, are alone in engagement with the road surface, and the flanges 8 are entirely removed therefrom so as not to be subjected to wear, as clearly appears from Figs. 1, 2, and 3.

Upon driving onto a road having ruts therein, such as a country road or a highway having snow packed thereon and worn away in places, the flanges 8 will from time to time, or continuously, depending upon the particular condition of the road surface, engage the road and increase the tractive properties of the tire so as to minimize objectionable skidding and slipping. In this connection, it is to be observed that the laterally or axially projecting flanges 8 materially increase the effective width of the tire in engagement with the road so as to reduce the likelihood of the tire becoming embedded or mired in soft stretches of the pavement such as occurs in sandy roads or roads which are poorly maintained. The flexibility of the flanges permits yielding and lateral displacement thereof upon being engaged by road obstructions such as rocks, curbs, and stones.

Figure 4:
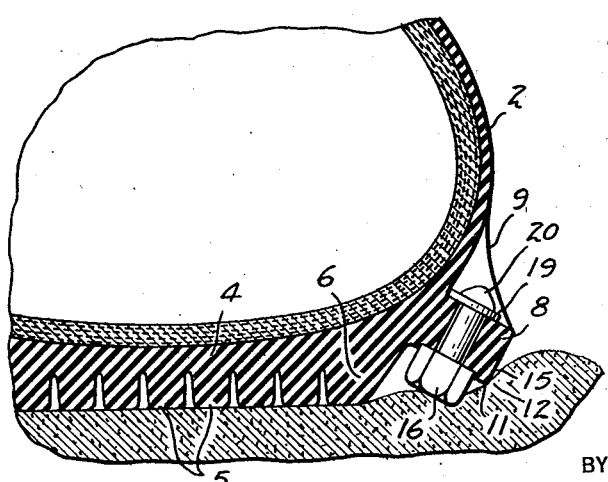
Fig. 4 is a fragmentary detail in section similar to Fig. 3 showing the loaded tire partially deflated and supported by an uneven road surface.

As shown in Figs. 2 and 3, the free or outer edges of the flanges 8 extend beyond the profile of the tire sidewalls. Accordingly, positive engagement occurs between the flanges and the sides of any ruts or grooves in which the tire may be traveling before chafing or scraping of the tire sidewalls. Preferably, the flanges are of sufficient width so that corners 11 thereof, which initially engage the road surface, project beyond the profile of the sidewalls. Upon partial deflation of the tire, the pivotal movement of the shoulders 6 and 7 carries the flanges slightly further apart so that they continue to project beyond the sidewalls which bow outwardly under the load imposed on the tire (see Fig. 4).

In the event that the roads are particularly slippery it may be desirable to insure that the flanges 8 maintain substantially continuous rolling contact with the road surface. This may be effected by partially deflating the tire so that it is distorted in the manner shown in Fig. 4. This distortion moves the slanting shoulders 6 and 7 toward the road surface, pivoting the edge portions 11 of the flanges 8 into engagement with portions 12 of the road. Thus the outwardly directed surfaces 15 of the flanges may be partially embedded in the snow or mud covering the road, to abut thereagainst and resist the lateral movement of the tire. While running on the tire in partially deflated condition, the portion thereof at the bottom, and which sustains the load, is deformed so that the sidewalls 2 and 3 move away from one another and are spaced a greater distance apart than normally. This deformation moves the flanges 8 into continuous rolling contact with the road surface. Thus the flanges serve as supplementary tread surfaces which assist in supporting the deformed sidewalls which are subjected to greater and different stress because of their deformation. The deflated tire thus presents a broad tread of greater width than the tire profile to the road surface, insuring a secure non-skid grip thereon.

After the vehicle has traversed the rutted or poorly kept portion of the highway the tires can be quickly and easily inflated to their normal operating pressure at any convenient station, without objectionable inconvenience or bother to the driver.

In order to increase the tractive properties of the tire it is contemplated to secure a multiplicity of anti-skid studs 16 to the flanges 8 at uniformly spaced intervals about the circumference of the tire. The studs 16 may be formed of suitable wear-resisting material of a hard character such as stainless steel and have shank portions 17 received in apertures 18 formed substantially radially in the flanges 8. Split washers 19 are received on the stud shanks and serve to retain the studs 16 in place. Each washer engages a circumferential shoulder formed at one end of the shank 17 by an increased diameter portion 20. Preferably the flanges 8 are slightly thicker than the length of the stud shanks so that the inherent resiliency of the rubber compressed between the washers and heads of the studs retains the increased diameter portions 20 of the studs seated in counterbores 21 of the lock washers 19. The head portions of the studs are thus directed radially outward with respect to the tire and are normally disengaged from the road surface, as indicated in Figs. 1 through 3. However, upon traveling over an uneven road or when the tire is partly deflated in the manner indicated in Fig. 4, the heads 16 may be brought into frictional driving engagement with the road surface to increase the tractive properties of the tire. Preferably, portion 22 of each of the stud heads, which surrounds the shank 17, is dished or concave so that the marginal edges bite into the rubber of the flange.

To remove the anti-skid studs for replacement by new unworn studs or if they are no longer required, the rubber of the flange 8 adjacent each of the apertures 18 is compressed by a suitable implement such as pinchers. The split washers 19 thus released may be removed laterally from the shanks 17 and the latter then withdrawn from the apertures in the flange.

Although the flanges 8 and anti-skid studs 16 are normally out of engagement with the highway or road surface when the latter is in good condition and relatively smooth, the flanges and studs are arranged in such relation to the shoulders of the tire that upon distortion of the tire which occurs when the vehicle is traveling around a sharp curve at relatively high speed, one of the flanges and the studs associated therewith may be brought into frictional engagement with the highway surface to prevent objectionable side slip or skidding of the vehicle.

A particularly advantageous feature of the invention is the positioning of the studs 16 in relatively detached relation with respect to the carcass of the tire. Thus, upon the striking of one of the studs against a hard, non-yielding road obstruction such as a rock or stone, the shock is primarily absorbed by the flexible flange 8 and objectionable distortion and strain of the carcass such as would occur if the stud were embedded therein or attached directly thereto, is avoided.

The present invention thus provides a vehicle tire having laterally projecting flanges which are normally out of engagement with the road surface but which are adapted to be brought into frictional engagement therewith upon distortion of the tire carcass such as occurs upon partial deflation of the same or when the vehicle equipped with the tires is rapidly driven around a relatively sharp curve.

Other modes of utilizing the principles of the present invention may be resorted to, numerous modifications of the embodiment shown in the drawing and described above, and numerous changes in details of construction and substitution of parts being contemplated, the particular construction described being given for purposes of explanation and illustration. The scope of the invention is defined in the following claims.

What I claim is:

1. A pneumatic tire having flexible side walls and a road engaging tread portion of rubber, a shoulder portion of rubber extending between one of the side walls and the tread surface, an integral substantially axially extending flexible rubber flange formed on the shoulder, and metallic anti-skid elements secured in the flange.

2. A pneumatic tire having flexible side walls and a road engaging tread portion of rubber, a shoulder portion of rubber extending between one of the side walls and the tread surface, an integral substantially axially extending flexible rubber flange formed on the shoulder at a portion thereof removed from the tread so that the flange remains disengaged from the road surface during normal operation of the tire, metallic anti-skid elements secured in the flange, said flexible side walls being adapted upon partial deflation of the tire to bow outwardly under the weight of the load carried thereby and to force the flange and elements into frictional driving engagement with the road surface.

3. A pneumatic tire having flexible side walls and a road engaging tread portion of rubber, a shoulder portion of rubber extending between one of the side walls and the tread surface, an integral substantially axially extending flexible rubber flange formed on the shoulder at a portion thereof removed from the tread so that the flange remains disengaged from the road surface during normal operation of the tire, apertures through said flange and anti-skid elements extending through and secured in said apertures, the flexible side walls being adapted upon partial deflation of the tire to bow outwardly under the weight of the load carried thereby and to force the skid preventing elements and flange into driving engagement with the road surface.

4. A device of the character described comprising in combination an inflatable tire casing having a peripheral road engaging tread portion around the body thereof and a laterally extending rib member integral with the casing disposed adjacent the tread, and a relatively hard skid resisting element embedded in the rib but not in the body so that dislodgement of the element is ineffective to deflate the tire.

5. A device of the character described comprising in combination an inflatable tire casing having a peripheral road engaging tread portion around the body thereof and a laterally extending rib member integral with the casing disposed adjacent the tread, said rib being of greater width than thickness to facilitate lateral flexing thereof, and a relatively hard skid resisting element extending through the rib but not through the body so that dislodgement of the element is ineffective to deflate the tire.

6. A tire comprising an inflatable rubber casing having a peripheral road engaging tread, a laterally extending flexible rubber rib integral with the casing and disposed adjacent the tread, said rib being of greater width than thickness to permit lateral flexing thereof, integral reinforcing elements disposed in the angle between the rib and the casing to support the rib against lateral deflection, and relatively hard skid resisting elements extending through the rib and disposed between the reinforcing elements.

HERMAN T. KRAFT.